(12) United States Patent
Ozaki et al.

(10) Patent No.: US 7,320,842 B2
(45) Date of Patent: Jan. 22, 2008

(54) ELECTRODE CATALYST FOR FUEL CELL AND FUEL CELL USING THE SAME

(75) Inventors: Junichi Ozaki, 378-11, Aioi-cho, 1-chome, Kiryu-shi, Gunma-ken (JP); Asao Ooya, 642-5, Hishi-machi 5-chome, Kiryu-shi, Gunma-ken (JP); Akira Hamada, Moriguchi (JP)

(73) Assignees: Sanyo Electric Co., Ltd., Moriguchi-shi (JP); Junichi Ozaki, Kiryu-shi (JP); Asao Ooya, Kiryu-shi (JP)

( * ) Notice: Subject to any disclaimer, the term of this patent is extended or adjusted under 35 U.S.C. 154(b) by 366 days.

(21) Appl. No.: 10/371,185

(22) Filed: Feb. 24, 2003

(65) Prior Publication Data

US 2003/0175580 A1    Sep. 18, 2003

(30) Foreign Application Priority Data

Feb. 26, 2002   (JP)   ............................. 2002-050381

(51) Int. Cl.
*H01M 4/96* (2006.01)
*H01M 4/88* (2006.01)
*H01M 10/10* (2006.01)

(52) U.S. Cl. ........................... 429/44; 429/42; 502/101

(58) Field of Classification Search .................. 429/40, 429/42–44; 502/101
See application file for complete search history.

(56) References Cited

U.S. PATENT DOCUMENTS 5,482,797 A * 1/1996 Yamada et al. ............. 429/221

2003/0108477 A1 * 6/2003 Keller et al. ............. 423/447.1
2003/0175579 A1 * 9/2003 Uchida et al. ................ 429/42

FOREIGN PATENT DOCUMENTS

JP           09063594 A   *   3/1997

(Continued)

OTHER PUBLICATIONS

Ren et al. "Carbon nanotubes by the metallocene route", Mar. 21, 1997, Chemical Physics Letters 267 (1997), pp. 276-280.*
Office Action and Brief translation of Japanese Application No. 2002-050381 of Mar. 28, 2006.

*Primary Examiner*—Gregg Cantelmo
(74) *Attorney, Agent, or Firm*—Kratz, Quintos & Hanson, LLP

(57) ABSTRACT

To provide an electrode catalyst for a fuel cell comprising inexpensive materials substituting for a precious metal catalyst such as platinum, and a fuel cell using the same. Poly (furfuryl alcohol) containing ferrocene is prepared by dissolving ferrocene corresponding to 1 to 3 wt % on the iron atomic basis in furfuryl alcohol, adding hydrochloric acid (2 mol/dm$^3$) thereto as a polymerization initiator, and then polymerizing them in the air at 70° C. for 48 hours. Random layers 2 developed into onion-like lamination layers around iron particles are produced by heating this poly (furfuryl alcohol) up to 700° C. at a temperature rising rate of 150° C./h, and then holding the state for an hour to carbonize it. The iron carbon complex having this structure of the random layers 2 is applied especially to the cathode side as the electrode catalyst, to form the cells for the fuel cell.

2 Claims, 4 Drawing Sheets

FOREIGN PATENT DOCUMENTS

| | | |
|---|---|---|
| JP | 9-248464 | 9/1997 |
| JP | 10-284089 | 10/1998 |
| WO | WO 01/92151 A1 | 6/2001 |
| WO | WO 200215303 A1 * | 2/2002 |

* cited by examiner

ELECTRODE CATALYST FOR FUEL CELL AND FUEL CELL USING THE SAME

BACKGROUND OF THE INVENTION

1. Field of the Invention

The present invention relates to an electrode catalyst for a fuel cell using a carbonaceous material of a special structure as an alternative catalyst for a precious metal catalyst such as platinum and relates to a fuel cell using the same.

2. Detailed Description of the Prior Art

As already known, in a solid polymer type fuel cell, a cell to be built in a cell module is comprised of a sheet-like solid polymer electrolyte film, an anode (fuel electrode) and a cathode (oxidant electrode) which are placed to oppose each other so as to hold this solid polymer electrolyte film in-between.

As the above-mentioned solid polymer electrolyte film, a fluorinated ion-exchange resin film representing a per-fluoro-sulfonic acid resin film (for example, Nafion film manufactured by DuPont) is used. Moreover, it is usual that the anode and the cathode (hereafter, simply called electrode (s)) are constructed comprising a catalyst layer and an electrode substrate containing a catalytic material, and are bonded on both principal surfaces of the solid polymer electrolyte film on the catalyst layer side by hot pressing.

For the electrode substrate mentioned above, a porous sheet (for example, carbon paper), which not only supports the catalyst layer, but also supplies and discharges reactant gases (fuel gas and oxidizer gas), and has also a function as a collector, is used. And, when the reactant gases are supplied to each of the above-mentioned electrodes, a three phase boundary of a gas phase (reactant gas), a liquid phase (solid polymer electrolyte film), and a solid phase (catalysts of both electrodes) is formed in the boundary between the catalyst layer carrying a platinum precious metal provided on both electrodes and the solid polymer electrolyte film, and thus an electrochemical reaction is caused to generate direct current power.

In the above-mentioned electrochemical reaction, the following reactions are caused, namely, on the anode side: $H_2 \rightarrow 2H^+ + 2e^-$
on the cathode side: $(\frac{1}{2})O_2 + 2H^+ + 2e^- \rightarrow H_2O$, and $H^+$ ion generated on the anode side moves toward the cathode side in the solid polymer electrolyte film, and $e^-$ (electron) moves to the cathode side via an external load. On the other hand, on the cathode side, the oxygen contained in the oxidizer gas reacts with $H^+$ ion and $e^-$ having moved from the anode side, and thereby water is produced. Thus, a solid polymeric fuel cell generates direct current power from hydrogen and oxygen, and produces water.

SUMMARY OF THE INVENTION

In the above-mentioned conventional solid polymeric fuel cell, platinum or an expensive precious metal catalyst such as platinum alloy catalysts (Pt—Fe, Pt—Cr, Pt—Ru, etc.) or the like has been used for an electrode, and the amount of use for a cell is about 1 mg/cm$^2$ which is relatively large, and this makes an electrode catalyst costly in a cell module. Therefore, it is one of the main technical purposes for practical use to reduce the amount of use of the precious metal catalyst.

In order to solve such a problem, various kinds of precious metal catalysts have been examined to decrease the amount of use, and as one of the methods, a method for forming an electrode by using a precious metal catalyst highly dispersed on carbon black having a high specific surface area in particles of a few nano-meters in particle diameter. However, in this proposal, decrease in catalytic performance due to sintering or elution of the catalyst becomes a problem, and even if such a method is used, 0.5 to 1 mg/cm$^2$ of the catalyst is necessary and the high cost problem still remains unsolved.

Further, as a catalyst substitute for platinum, an organo-metallic compound of a chelate structure or a metallic oxide of a pyrochlore structure is also being examined for the use, however, the actual situation is the fact that these are inferior to the platinum catalyst in catalytic activity.

Therefore, the purpose of the present invention, which has been worked out considering the situation of the conventional catalysts as described above, is to provide an electrode catalyst for a fuel cell which is made of an inexpensive material as a substitute for an expensive precious metal catalyst such as platinum and is high in catalytic activity.

Moreover, another purpose of the present invention is to provide a fuel cell using the highly active electrode catalyst made of the inexpensive material.

In order to achieve the purposes mentioned above, as a result of the zealous researches conducted by the inventors, they have found out that a carbon material obtained by adding an iron group compound such as ferrocene to a raw material for producing graphitization-resistant carbon such as poly (furfuryl alcohol), furan resin, and phenol resin, heating them at 700° C. to 3000° C. in an inert atmosphere such as in helium, argon, and vacuum, and controlling the carbonization reaction, contains a phase having a structure analogous to graphite (a kind of a random layer structure having parallel lamination layer structure in the direction of a carbon hexagonal mesh plane and having no regularity in the three-dimensional directions) developed into onion-like lamination layers around metallic particles such as those of nano-order iron.

It has been found out that this carbon nano-onion phase manifests a high oxygen reducing performance considered to be caused by the crystallographic structure of the surface different from that of normal graphite. Therefore, the inventors have found out that the above-mentioned problem can be solved by applying a material containing this carbon nano-onion phase to the electrode catalyst for a fuel cell (in particular, a cathode side electrode catalyst), and making this carbon nano-onion phase act as the catalyst in the cathodic reaction (oxygen reduction and water production), and thus they have achieved the present invention.

The electrode catalyst for a fuel cell as claimed in claim 1 of the present invention is a carbon material consisting essentially of the graphitization-resistant carbon, and is characterized in using as an electrode catalyst one having a random layer structure at least in a part of the material structure.

The electrode catalyst for a fuel cell as claimed in claim 2 of the present invention is obtained through carbonization processing by baking after having added and mixed a metallic compound to the raw material for producing the graphitization-resistant carbon, and is characterized in using as an electrode catalyst one having a random layer structure at least in a part of the material structure.

0014:

The electrode catalyst for a fuel cell as claimed in claim 3 of the present invention is characterized in that the random layer structure is a carbon nano-onion structure developed into onion-like lamination layers around the metal particles.

The electrode catalyst for a fuel cell as claimed in claim 4 of the present invention is characterized in that the raw material for producing the graphitization-resistant carbon is to be selected from a group of the materials consisting of poly (furfuryl alcohol), furan resin or thermosetting resin including phenol resin, brown coal, cellulose, poly (vinylidene chloride) and lignin.

The electrode catalyst for a fuel cell as claimed in claim 5 of the present invention is characterized in that the metal compound contain at least one of these metals of iron, cobalt, nickel, chromium, and manganese.

The electrode catalyst for a fuel cell as claimed in claim 6 of the present invention is characterized in that an amount of the metal compound to be added to the graphitization-resistant carbon is in the range of 0.5 to 15 wt % on the basis of the metal component contained in the metal compound.

The electrode catalyst for a fuel cell as claimed in claim 7 of the present invention is characterized in that the metal compound has one of the forms of nitrate, chloride, acetyl-acetate or acetyl-acetate complex, metallocene and its derivatives.

The method for preparing the electrode catalyst for a fuel cell as claimed in claim 8 of the present invention is characterized in that the raw material for producing the graphitization-resistant carbon is added and mixed with a metallocene derivative containing at least one of these metals of iron, cobalt, nickel, chromium, and manganese and having a copolymerizing functional group, and after both of them have been copolymerized and mixed, they are carbonization-processed by baking.

The fuel cell as claimed in claim 9 of the present invention is characterized in using the electrode catalyst for the fuel cell as claimed in claim 1.

The fuel cell as claimed in claim 10 of the present invention is characterized in that the electrode catalyst for the fuel cell as claimed in claim 1 is produced like layers at least on one side of a solid polymer electrolyte film and is thereby used as electrode reaction layers.

The fuel cell as claimed in claim 11 of the present invention is characterized in that the electrode reaction layers are produced from a mixture of the electrode catalyst for the fuel cell as claimed in claim 1 and the solid polymer electrolyte.

The fuel cell as claimed in claim 12 of the present invention is characterized in that the electrode reaction layers as claimed in claim 10 or claim 11 are applied to the cathode side of the fuel cell.

BRIEF DESCRIPTION OF THE DRAWINGS

These and other objects and advantages of the present invention will become clear from the following description with reference to the accompanying drawings, wherein.

Figure 1:
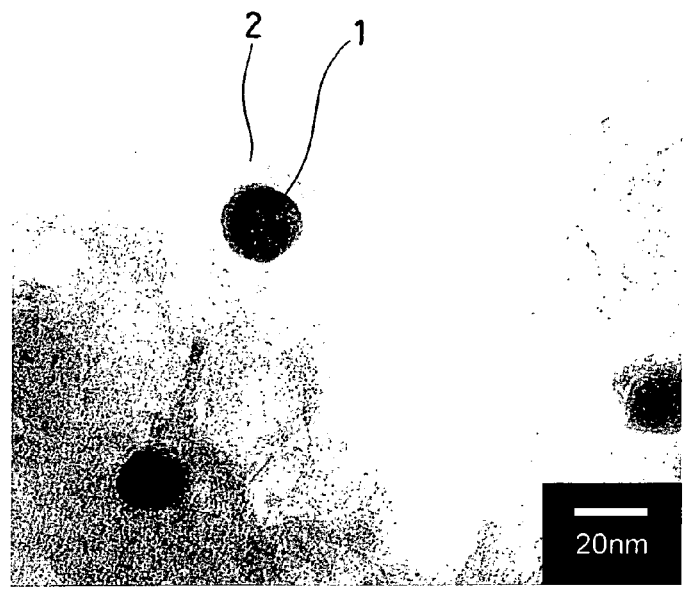
FIG. 1 is a part of a TEM image observed by the transmission electron microscope showing a carbonized state of an iron carbon complex prepared from ferrocene-poly (furfuryl alcohol) relating to the embodiment of the present invention.

| Explanation of References: | |
| --- | --- |
| 1 | iron particles |
| 2 | random layers |
| 2a | plane-like carbide |
| 3 | amorphous |

DETAILED DESCRIPTION OF THE PREFERRED EMBODIMENT

Next, preferred embodiments of the present invention will be described in details referring to the drawings.

Embodiment 1

Firstly, an iron carbon complex is prepared by mixing ferrocene with furfuryl alcohol (hereafter, abbreviated to FA) and carbonizing the mixture. For this purpose, poly (furfuryl alcohol) (hereafter, abbreviated to PFA) containing ferrocene is prepared by dissolving ferrocene corresponding to 1 to 3 wt % on the iron atom basis in FA, adding hydrochloric acid (2 mol/dm$^3$) as a polymerization initiator thereto, and then polymerizing them at 70° C. for 48 hours in the air. Following this, PFA is heated up to 700° C. at a programming rate of 150° C./h in an atmosphere of helium circulation, and then PFA is maintained in this state for an hour to be carbonized.

FIG. 1 shows a part of a TEM image of a carbonized state of the iron carbon complex observed by a transmission electron microscope, and it is possible to confirm from this image that a random layer 2 of a structure analogous to graphite developed into an onion-like lamination has been produced around a nano-order (nm) minute iron particle 1. Such a random layer structure has occupied about 60% of the whole. The remaining part is regarded as being composed of an amorphous structure and a little of a graphitized structure.

Figure 2:
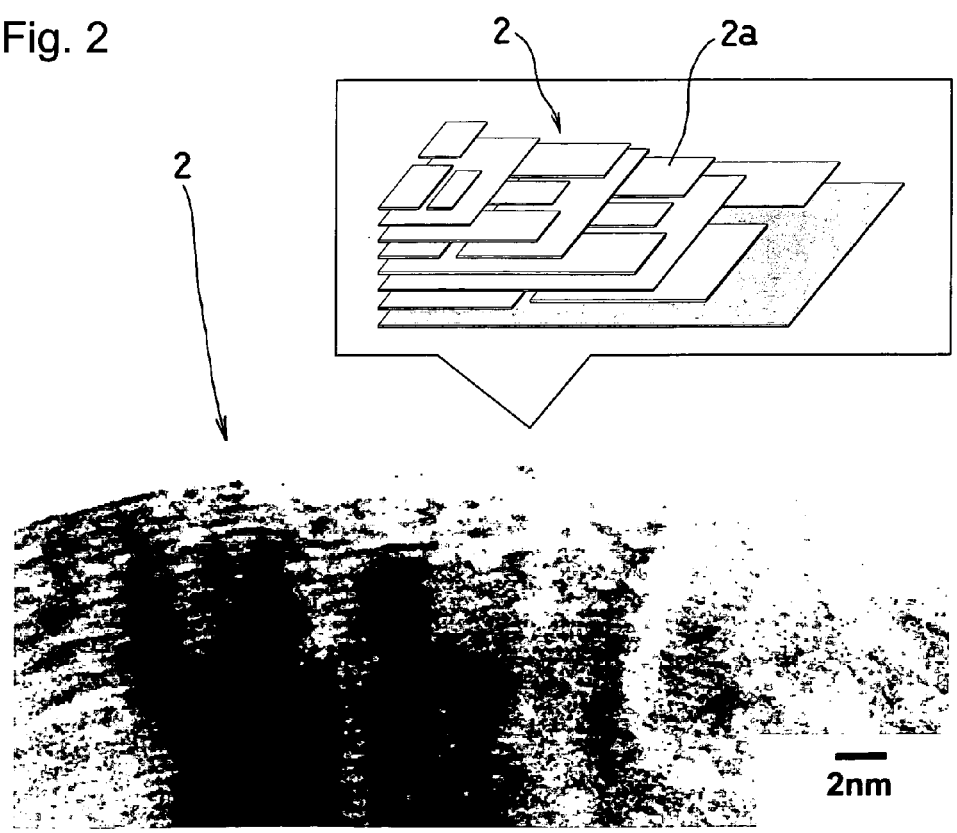
FIG. 2 is a TEM image enlarging a part of the random layers of a structure analogous to graphite developed into onion-like lamination layers around the iron particles, and a schematic view of a part thereof.

FIG. 2 is a TEM image of the random layer 2 which is partly magnified, and, a plurality of plane-like carbide 2a is present in parallel in the same plane and is also a structure multilaminated like an onion, as it is partly illustrated in a schematic form. Each plane-like carbide 2a is in the form of two-dimensional chain of hexagonally-linked carbon atoms. Such a random layer 2 has been obviously different from the graphitized structure in the point that there is no regularity in the three-dimensional direction (direction of lamination). The spacing between the faces in the direction of lamination is 3.40 Å that is narrower than those of PFA (3.9 Å) and pitch coke PC (3.45 Å), and shows an approximate value of graphite for electrode GE (3.38 Å).

Figure 3:
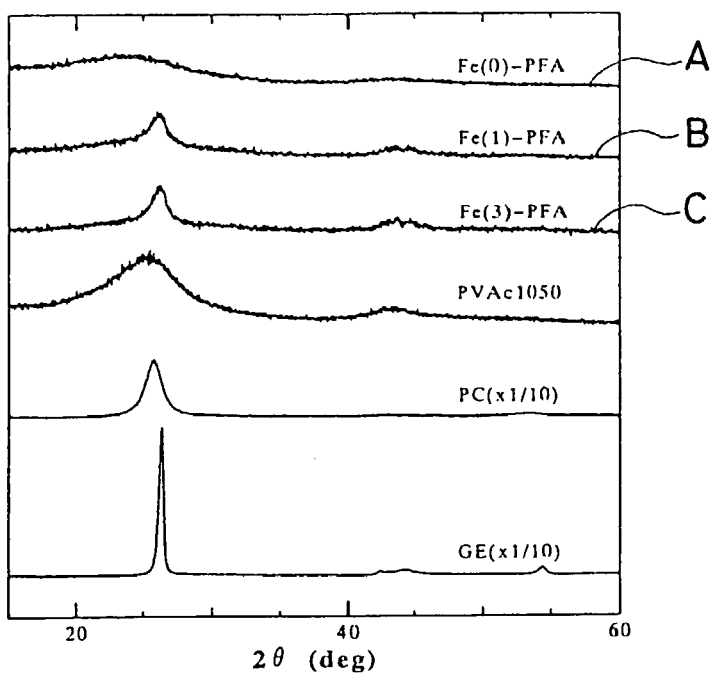
FIG. 3 is an X-ray diffraction (XRD) patterns of iron carbon complex or the like using Cu—Kα rays.

FIG. 3 shows X-ray diffraction patterns (XRD) of an iron carbon complex etc. by using Cu—Kα rays, and the pattern A shows a case of 0 wt % addition of iron atomic basis, the pattern B shows a case of 1 wt % addition, and the pattern C shows 3 wt % addition. Moreover, for comparison with these PFA carbons, a graphite electrode (GE) manufactured by Toshiba Ceramics Co., Ltd. pitch coke (PC) manufactured by Nippon Steel Chemical Co., Ltd. and a sample of polyvinyl acetate (PVAc 1050) carbonized at 1,050° C. have been used.

Looking at these XRD patterns, any of GE, PC, PVAc 1050, Fe(3)-PFA, and Fe (1)-PFA shows a large diffraction line peak near 2θ=26°. However, Fe (0)-PFA does not show a large diffraction line peak. According to this result, PFA carbon prepared by mixing iron therein obviously brings a difference from PFA carbon without iron in the characteristic, and this difference is considered to be caused by the random layers 2. Moreover, it has also been found out that the more iron is added, the larger the diffraction line peak is. Scattering in the neighborhood of the (002) diffraction of Fe (1)-PFA and Fe (3)-PFA is about 1/10 in the case of PC and GE. Thus, the iron carbon complex prepared in this embodiment is considered to have a random layer structure that has mostly been undeveloped in graphitization but is partly graphitized.

Figure 4:
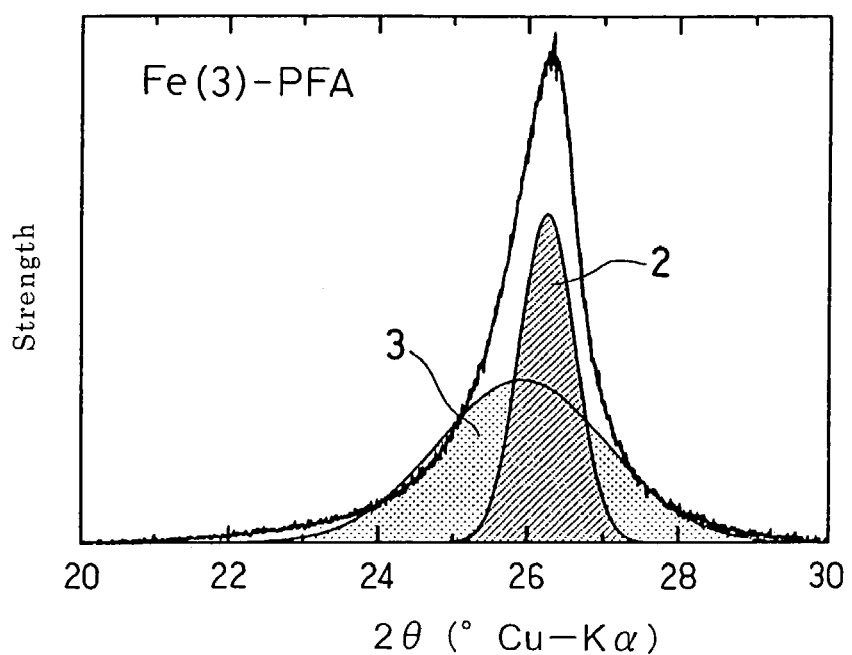
FIG. 4 is an enlarged view of the diffraction line peak parts of Fe (3)-PFA which is one of iron carbon complexes.

FIG. 4 is an enlarged view of the diffraction line peak part of the above-mentioned Fe (3)-PFA pattern C, and it is considered that the oblique line area shows the random layer structure 2, and the dotted area shows the amorphous structure 3. The measurement conditions of this case are; a powder X-ray diffraction device: RINT 2100 V/PC manufactured by Rigaku, a heat source: Cu—Kα, voltage: 32 kV, current: 20 mA, scanning speed: 0.2°/min, and sampling width: 0.010°.

Since PFA carbon provided with the random layer structure has been found out to have an electrode characteristic as GE, a test electrode was made by the method as described below.

(1) The carbon material obtained was ground in an agate mortar and was passed through a 100-mesh sieve.

(2) A 5% solution of Nafion™ manufactured by Aldrich Co., Ltd. was mixed with the carbon material and made into paste so that P/(P+Q) was 25% [P: mass of the solid polymer electrolyte, Q: mass of the carbon material].

(3) The paste made by the step (2) was applied to the carbon paper (TGP-H060) manufactured by Toray Industries, Inc. coated with a thin layer consisting of carbon black (VulcanXC-72) and PTFE. In this case, a carrying quantity of carbon material was adjusted to 10 mg/cm$^2$.

(4) Thereafter, drying treatment was carried out at a room temperature and 60° C.

Next, a test cell was manufactured by the following method.

(1) An electrode made by using conventional carbon carrying platinum as a catalyst was employed as an anode, and the electrode made by the above-mentioned method was employed as a cathode (dimensions of the electrodes: 1 cm×1 cm).

(2) Nafion™ 112 manufactured by DuPont was used as the solid polymer electrolyte film and the anode and cathode made by the step (1) were arranged on both sides of the film.

(3) These electrodes and the laminated body of the solid polymer electrolyte film were was hot-pressed at 150° C. and 5 MPa for 30 sec to make it into an electrode-solid polymer electrolyte film connection body (MEA).

(4) The MEA obtained was assembled in a fuel cell and used as a cell for evaluating the performance.

Figure 5:
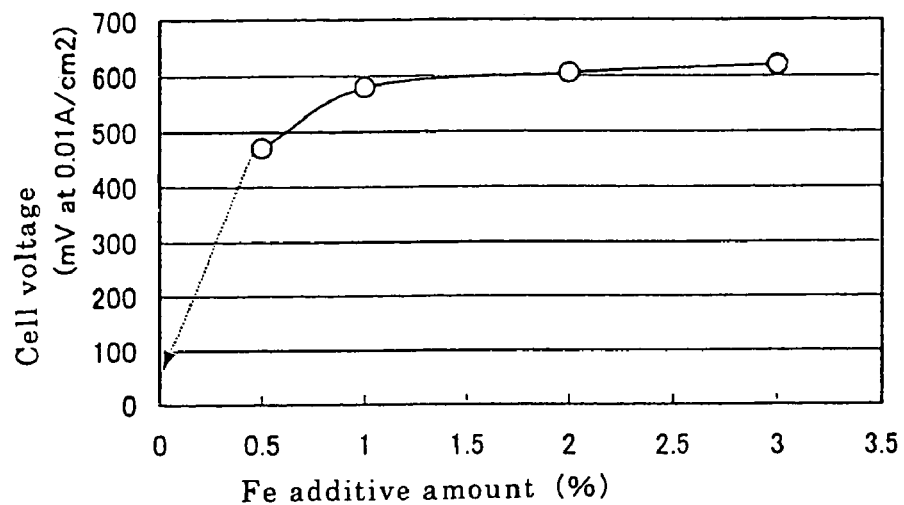
FIG. 5 is a graph showing the test results of a cell of a fuel cell using an iron carbon complex as an electrode catalyst.

A reaction gas was supplied to the anode and the cathode of the cell for evaluating the performance, and experiments were performed on power generation. The addition amount of ferrocene (addition amount of iron) to the carbon material was made to 0.5 wt %, 1 wt %, 2 wt %, and 3 wt % on iron atomic basis. FIG. 5 shows the results of the experiment, and the cell voltages were 470 mV with 0.5 wt %, 580 mV with 1 wt %, 605 mV with 2 wt %, and 620 mV with 3 wt %, respectively. In this case, the current density was 0.01 A/cm$^2$. The power generation was increased in performance as ferrocene was increased in the addition amount, and although the power generation performance was low with the addition amount of 0.5 wt %, catalytic activity appeared. With the addition amount of 3 wt %, the best power generation performance was shown, a significant increase in power generation cannot be expected even if the addition amount is increased further. Moreover, with an addition mount less than 0.5 wt %, a substantial decrease in power generation is foreseen. Thus, an addition amount of ferrocene is preferred to be 0.5 to 3 wt %.

Embodiment 2

Next, an example of having prepared an iron carbon complex by using brown coal will be described below.

In this embodiment, the particle diameters were arranged to 2 to 5.6 mm, and Loy Yang coal (hereafter, abbreviated to LY) which was from Australia and stored in the air was used as a coal sample. This LY coal had 41.8% water, 63.9% carbon, 4.8% hydrogen, 0.6% nitrogen, and 30.7% O$_{diff}$ by weight, respectively.

The above-mentioned LY coal was made to carry 0 to 10 wt % Fe (NO$_3$)$_3$.9H$_2$O of iron atomic basis from its water solution as an iron catalyst by an impregnation method. The carbonization was carried out by heating the sample up to 1000° C. at a temperature rising rate of 150° C./min in the atmosphere of helium, and keeping it at the temperature for an hour.

The structure of the iron carbon complex obtained was examined by X-ray diffraction measurement and observation through a transmission electron microscope. Cu—Kα rays were used for the XRD measurement. The TEM observation was performed on the sample which had been ground in an agate mortar, dispersed in acetone, and prepared by scooping it with a micro grid for TEM.

Figure 6:
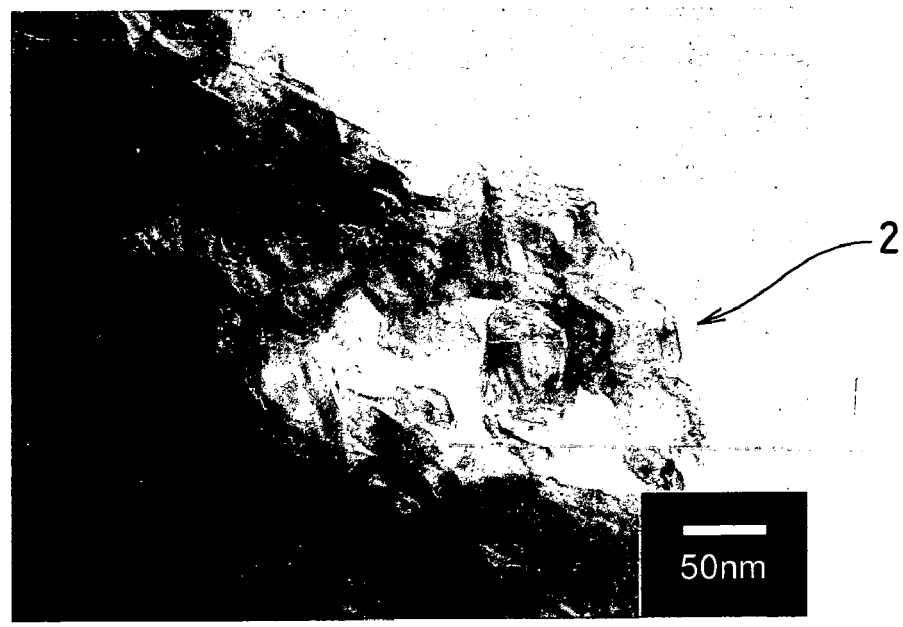
FIG. 6 is a part of a TEM image observed by the transmission electron microscope showing a carbonized state of iron carrying brown coal relating to an alternate embodiment of the present invention.

FIG. 6 is a TEM image showing the carbonized state of the iron carbon complex, and it could be confirmed from the image that the random layers 2 of the structure analogous to graphite and developed into onion-like or bamboo-like lamination layers were produced. As the measuring conditions in this case, JEM-1200 EXS Transmission Electron Microscope manufactured by JEOL.Ltd was used, and accelerating voltage was 100 kV. Micro iron particles were not present, but they are considered that they were vaporized and disappeared at the time of the high temperature processing.

Figure 7:
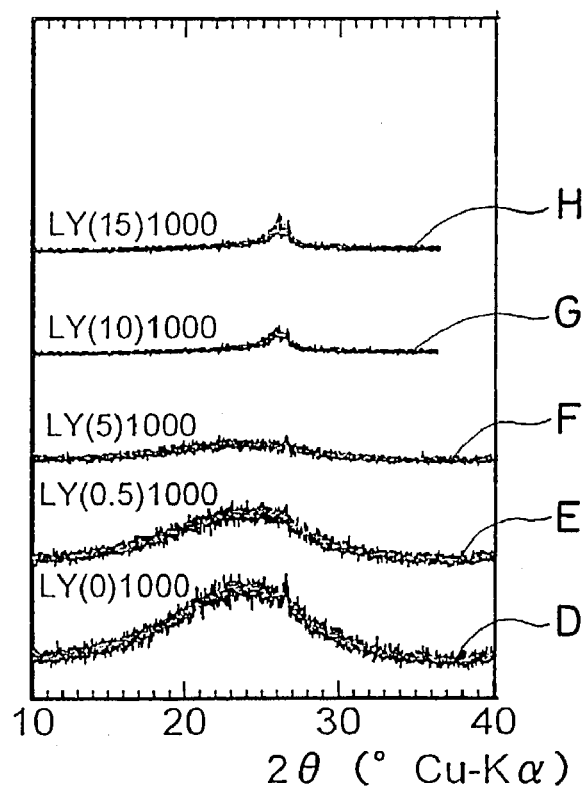
FIG. 7 is an X-ray diffraction (XRD) patterns of iron carrying brown coal using Cu—Kα rays.

FIG. 7 shows the patterns of X-ray diffraction (XRD) of the iron carbon complex using Cu—Kα rays, and the pattern D is the one for a 0 wt % addition amount of Fe(NO$_3$)$_3$.9H$_2$O on an iron atomic basis; E is the pattern for 0.5 wt %; F is the pattern for 5 wt %; G is the pattern for 10 wt %; and H is the pattern for 15 wt %, respectively.

According to these XRD patterns, the pattern G and the pattern H have a large diffraction line peak around at 2θ=26°. In the pattern F, a slight diffraction line peak was observed, but in the other patterns, no significant diffraction line peak was observed. From these results, the random layer structure is produced in the case that an addition amount of Fe(NO$_3$)$_3$.9H$_2$O on an iron atomic basis is 5 to 15 wt %. It was also found out that the more an addition amount of $Fe(NO_3)_3 \cdot 9H_2O$ is, the larger diffraction line peak appears, however, when the addition amount reaches 15 wt %, there was an upward tendency of diffraction peak sharpness considered to originate from graphite. Therefore, an addition amount of $Fe(NO_3)_3 \cdot 9H_2O$ is preferred to be 5 to 15 wt % on an iron atomic basis.

Moreover, the carbonization processing was carried out at the temperature of 1000° C. in the present embodiment, however, the sample carbonized at 1000° C. was further heat-treated in a vacuum in a Tammann furnace at 1500° C. and 2000° C., and was also heat-treated in an argon flow at 3000° C. for 30 min. As the heat treating temperature rose, the diffraction lines were increased in sharpness, and new diffraction lines appeared at $2\theta=26.4°$ in addition to the previous main diffraction line peak at $2\theta=26°$ at 2000° C. Moreover, the peak originating from iron disappeared then due to evaporation of iron. Thus, it was found out that any of the samples were graphitized in multiple phases by the high-temperature heat treatment.

In the present embodiment also, a test electrode was made by the method as described below.

(1) The carbon material obtained was ground by an agate mortar, and was passed through a 100-mesh sieve.

(2) A 5% solution of Nafion™ manufactured by Aldrich Co., Ltd. was mixed with the carbon material and made into paste so that P/(P+Q) was 25% [P: mass of the solid polymer electrolyte, Q: mass of the carbon material].

(3) The paste made by the step (2) was applied to the carbon paper (TGP-H060) manufactured by Toray Industries, Inc. coated with a thin layer consisting of carbon black (VulcanXC-72) and PTFE on one side thereof. In this case, a carrying quantity of carbon material was adjusted to 10 mg/cm².

(4) Thereafter, drying treatment was carried out at a room temperature and 60° C.

Next, a test cell was made by the following method.

(1) An electrode made by using conventional carbon carrying platinum as a catalyst was employed as an anode, and the electrode made by the above-mentioned method was employed as a cathode (dimensions of the electrodes: 1 cm×1 cm).

(2) Nafion™ 112 manufactured by DuPont was used as the solid polymer electrolyte film and the anode and cathode made by the step (1) were arranged on both sides of the film.

(3) These electrodes and the laminated body of the solid polymer electrolyte film were hot-pressed at 150° C. and 5 MPa for 30 sec to make it into an electrode-solid polymer electrolyte film connection body (MEA).

(4) The MEA obtained was assembled in a fuel cell and used as a cell for evaluating the performance.

Figure 8:
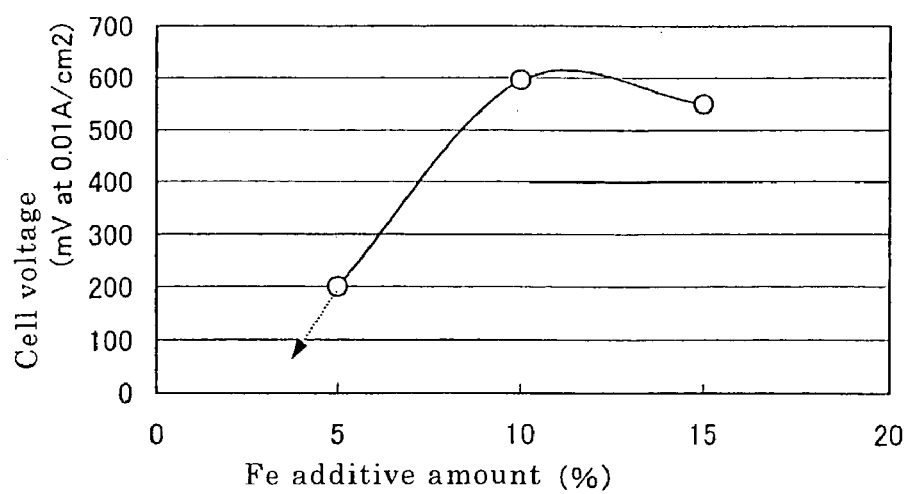
FIG. 8 is a graph showing the test results of a cell of a fuel cell using iron carrying brown coal as an electrode catalyst.

A reaction gas was supplied to the anode and the cathode of the cell for evaluating the performance, and experiments were performed on power generation. The addition amounts of $Fe(NO_3)_3 \cdot 9H_2O$ (addition amount of iron) to the carbon material were made to 5 wt %, 10 wt %, and 15 wt % on iron atomic basis. FIG. 8 shows the results of the experiments, and the cell voltages were 200 mV with 5 wt %, 595 mV with 10 wt %, and 550 mV with 15 wt %, respectively. In this case, the current density was 0.01 A/cm². Although the power generation performance was low with the addition amount of 15 wt %, catalytic activity appeared. With the addition amount of 10 wt %, the best power generation performance was presented, however, the power generation performance was lower than that in the case using the poly (furfuryl alcohol). Thus, an addition amount of $Fe(NO_3)_3 \cdot 9H_2O$ is preferred to be 10 wt %.

In the embodiments 1, 2 described above, the production of graphitization-resistant carbon was explained by the examples using poly (furfuryl alcohol) or brown coal as a raw material therefor, however, thermosetting resin including furan resin or phenol resin, cellulose, poly (vinylidene chloride), lignin, or the like can be used other than the aforementioned materials. Moreover, both of the embodiments 1, 2 were explained by the examples using an iron carbon complex, however, cobalt, nickel, chromium, manganese, or the like can be used other than iron. As metal compounds, they can take the forms of nitrates, chlorides, acetylacetonato or acetylacetenato complex, metallocene and its derivatives.

Moreover, a metal-carbon complex may be produced by adding and mixing a metallocene derivative containing at least one of iron, nickel, chromium, and manganese and also having a copolymerizing functional group with a raw material for producing graphitization-resistant carbon, and copolymerizing and mixing both of them.

Further, in the embodiments 1, 2, an electrode catalyst is formed in a thin layer form on the solid polymer electrolyte film surface as an electrode reaction layer, however, the electrode reaction layer can also be formed from the mixture of the electrode catalyst and the solid polymer electrolyte.

The electrode catalyst for a fuel cell as claimed in claim 1 of the present invention is a carbon material consisting essentially of graphitization-resistant carbon, and uses the one having a random layer structure at least in a part of the structure of the carbon material as the electrode catalyst, therefore, it can be provided as an electrode catalyst with high catalyst activity at an inexpensive price as a substitute for a precious metal catalyst such as platinum or platinum compound or the like.

The electrode catalyst for a fuel cell as claimed in claim 2 of the present invention is obtained through carbonization processing by baking after having added and mixed a metallic compound to the raw material for producing the graphitization-resistant carbon, and uses the one having a random layer structure at least in a part of the structure of the carbon material as the electrode catalyst, therefore, it can be manufactured with ease and also a carbon material provided with a catalytic function just as desired by controlling the carbonizing process. As the control method, for example, the conditions such as a raw material, a reaction atmosphere, a treating temperature, or the like are selectable.

The electrode catalyst for a fuel cell as claimed in claim 3 of the present invention has a carbon nano-onion structure developed into onion-like lamination layers around the metal particles from the random layer structure, and is obtainable as a catalyst excellent in performance.

For the electrode catalyst for a fuel cell as claimed in claim 4 of the present invention, a raw material for producing the graphitization-resistant carbon is to be selected from a group of the materials consisting of poly (furfuryl alcohol), furan resin or thermosetting resin including phenol resin, brown coal, cellulose, poly (vinylidene chloride) and lignin, therefore, the costs can be reduced by selecting those materials as necessary.

Since the electrode catalyst for a fuel cell as claimed in claim 5 of the present invention is characterized in that the metal compound contains at least one of these metals of iron, cobalt, nickel, chromium, and manganese, it is possible to select a metal suitable for the manufacturing conditions.

In the electrode catalyst for a fuel cell as claimed in claim 6 of the present invention, an amount of the metal compound to be added to the graphitization-resistant carbon is in the range of 0.5 to 15 wt % on the basis of the metal component (s) contained in the metal compound, therefore, an electrode provided with a desired catalytic activity can be made by altering the addition amount of the metal compound as necessary.

In the electrode catalyst for a fuel cell as claimed in claim 7 of the present invention, the metal compound has one of the forms of nitrate, chloride, acetyl-acetate or acetyl-acetate complex, metallocene and its derivatives, therefore, the metal compound suitable for the manufacturing costs and conditions can be selected.

In the method for preparing the electrode catalyst for a fuel cell as claimed in claim 8 of the present invention, the raw material for producing the graphitization-resistant carbon is added and mixed with a metallocene derivative containing at least one of these metals of iron, cobalt, nickel, chromium, and manganese and having a copolymerizing functional group, and after both of them have been copolymerized and mixed, they are carbonization-processed by baking, therefore, a desired electrode catalyst can easily be prepared.

The fuel cell as claimed in claim 9 of the present invention can be reduced in the cell module cost by using the electrode catalyst for the fuel cell as claimed in claim 1.

In the fuel cell as claimed in claim 10 of the present invention, the electrode catalyst for the fuel cell as claimed in claim 1 is formed into layer-like one at least on one side of a solid polymer electrolyte film and is used as electrode reaction layers, therefore, the electrode-film connection body can be reduced in cost.

In the fuel cell as claimed in claim 11 of the present invention, the electrode reaction layers are formed from a mixture of the electrode catalyst for the fuel cell as claimed in claim 1 and the solid polymer electrolyte, therefore, the electrolyte network can be developed also in the direction of thickness of the catalyst layers rather than one simply arranging the electrode catalyst on the surface of the solid polymer electrolyte film. It is possible to substantially increase the number of three-phased interfaces acting as a reaction site and obtain a high electrode activity by forming the electrode catalytic layers into such a structure.

In the fuel cell as claimed in claim 12 of the present invention, the electrode reaction layers as claimed in claim 10 or claim 11 are applied to the cathode side of the fuel cell, therefore, the cathode side manifests a high oxygen reducing performance, and thereby the power generation performance can be improved.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A fuel cell, comprising:
    a cathode and an anode; and
    a layer comprising an electrode catalyst on the cathode or the anode. said electrode catalyst comprising graphitization-resistant carbon, at least a portion of the electrode catalyst having a random layer structure developed into lamination shell layers. said electrode catalyst being formed into a layer on at least one side of a solid polymer electrolyte film,
    wherein said random layer structure is a carbon nano-onion structure in which the lamination shell layers wind around metal particles.

2. A fuel cell as claimed in claim 1, wherein said metal particles comprise particles in which the metal is iron, cobalt, nickel, chromium, manganese.

* * * * *